United States Patent [19]

Stone

[11] Patent Number: 5,065,310
[45] Date of Patent: Nov. 12, 1991

[54] REDUCING CACHE-RELOAD TRANSIENT AT A CONTEXT SWAP

[75] Inventor: Harold S. Stone, Chappaqua, N.Y.

[73] Assignee: International Business Machines Corporation, Armonk, N.Y.

[21] Appl. No.: 349,621

[22] Filed: May 10, 1989

[51] Int. Cl.$^5$ .............................................. G06F 13/26
[52] U.S. Cl. .................................. 395/425; 364/230.2; 364/239.5; 364/241.3; 364/DIG. 1
[58] Field of Search ... 364/200 MS File, 900 MS File

[56] References Cited

U.S. PATENT DOCUMENTS

| | | | |
|---|---|---|---|
| 4,382,278 | 5/1983 | Appelt | 364/200 |
| 4,422,145 | 12/1983 | Sacco et al. | 364/200 |
| 4,425,616 | 1/1984 | Woodell | 364/200 |
| 4,463,424 | 7/1984 | Mattson et al. | 364/200 |
| 4,484,274 | 11/1984 | Barenbaum et al. | 364/200 |
| 4,794,521 | 12/1988 | Ziegler et al. | 364/200 |

*Primary Examiner*—Gareth D. Shaw
*Assistant Examiner*—John Q. Chavis
*Attorney, Agent, or Firm*—Whitham & Marhoefer

[57] ABSTRACT

Suspensions of programs running in a multi-programming environment are made to occur when the footprint of a program to be suspended is relatively small. This occurs when a process releases data or instruction storage in the cache because the program has moved to a different phase of behavior. An interrupt is armed to occur at small-footprint points, and then the point where that occurs is detected.

4 Claims, 3 Drawing Sheets

REDUCING CACHE-RELOAD TRANSIENT AT A CONTEXT SWAP

BACKGROUND OF THE INVENTION

1. Field of the Invention

The present invention generally relates to cache memory management in high performance data processing systems and, more particularly, to a means for reducing the cost of cache misses at context swap points by choosing points in time for swapping contexts when a program's footprint tends to be small.

2. Description of the Prior Art

In multi-programmed or multi-tasking computer systems, a processor is shared among many different programs by periodically changing the program or task that is running on the processor. For computing systems with cache memories, at the point that one program, or task, is suspended and another is begun, the cache contains many lines that belong to the suspended program. These lines will tend to be displaced from cache as subsequent programs run and will have to be reloaded when the suspended program regains control of the processor. The overhead for reloading those lines is called the cache-reload transient. D. F. Thiebaut and H. S. Stone in an article entitled "Footprints in the Cache" published in *ACM Trans. on Computing*, vol. 5, no. 4, Nov. 1987, at pages 305 to 329, report their studies of this problem and propose a model for calculating the size of the transient that they validated by several different case studies. The size of the transient is related to the size of the footprint of the program, which is the number of active lines that the program has in the cache.

It is known in the prior art to reduce the cost of context swaps by changing as little as possible, or by other means to reduce the overhead of the context swap. However, the prior art assumes that context swaps must be taken when a request for a swap is issued.

U.S. Pat. No. 4,422,145 to Sacco et al. describes the management of a pool of pages in buffer memory that takes advantage of knowledge of future requests for data. It uses this knowledge to hold the most likely future requests in the buffer pool where they can be retrieved quickly. It is intended to solve a problem of allocation of pages to tasks.

U.S. Pat. No. 4,463,424 to Mattson et al. describes an invention similar to that of Sacco et al., although it differs in detail. Mattson et al. measure task behavior to determine how to allocate memory to individual tasks so as to reduce the number of misses in cache memory. However, requests made to cache memory are honored in the order received.

U.S. Pat. No. 4,484,274 to Berenbaum et al. describes a procedure which identifies what part of the state of a process actually needs to be saved when an interrupt occurs. Hence, given that an interrupt is to be honored, it attempts to save as little as possible. U.S. Pat. No. 4,382,278 to Appelt teaches how to reduce context swap overhead by switching workspaces. This reduces the amount of work at a context swap. T. G. Lang in *IBM Technical Disclosure Bulletin*, July 1986, p. 947, describes a means for speeding the context swap by reducing some overhead associated with the process of saving context.

SUMMARY OF THE INVENTION

It is therefore an object of the present invention to provide a way to reduce the cache-reload transient by carefully selecting the times at which programs can be suspended.

It is another object of the invention to provide a multi-tasking computing system with a way to accomplish context swapping at a point when the footprint of a current task is small.

According to the invention, suspensions of programs running in a multi-programming or multi-tasking environment are made to occur when the footprint of a program or task to be suspended is relatively small. This occurs when a process releases data or instruction storage in the cache because the program has moved to a different phase of operation. More particularly, the invention is an interrupt that is armed to occur at small-footprint points, and a means for detecting when such a point occurs.

The invention can be implemented or not with other prior art systems, including those described above, to further enhance the operation of a multi-programmed or multi-tasking computer system. The subject invention differs from the Sacco et al. invention in that the Sacco et al. invention does not contain the idea that requests can be deferred in order to reduce the cost of context swaps. Requests are honored as they are presented to the processor, and memory management is performed as a consequence of the requests received and anticipated future requests. Nor does Mattson et al. attempt to defer or reorder such requests in order to reduce the number of misses. Rather, the invention of Mattson et al. manages a memory resource in response to a sequence of requests for that resource, whereas the subject invention defers a request to a time when it can be honored at a low cost. Also, none of Berenbaum et al., Appelt or Lang are concerned with when to make a context swap, which is the basic concept of the subject invention.

Thus, in the present state of the art, a context swap is initiated when a program exceeds its allocated time quantum or when it reaches a programmed wait or an input/output (I/O) operation or other similar reason. The invention incorporates a context-swap interrupt that is different from the usual quantum-timeout interrupt in that this interrupt has two times associated with it. The first time is a minimum time that tells when the context-swap is to be armed. The interrupt cannot be posted until the minimum time passes. After the minimum time, the context-swap interrupt is armed and will be posted when a signal is received that indicates that a program footprint has decreased in size.

The second time associated with a context-swap interrupt is a maximum time. If no context-swap interrupt has been posted by the time the maximum time is reached, the context-swap interrupt will be posted at that point. Thus, the context-swap interrupt is similar to a quantum-timeout interrupt in that it assures that no program can run for too long a time, but it also tends to swap a program at a time that will cause lower future overhead.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
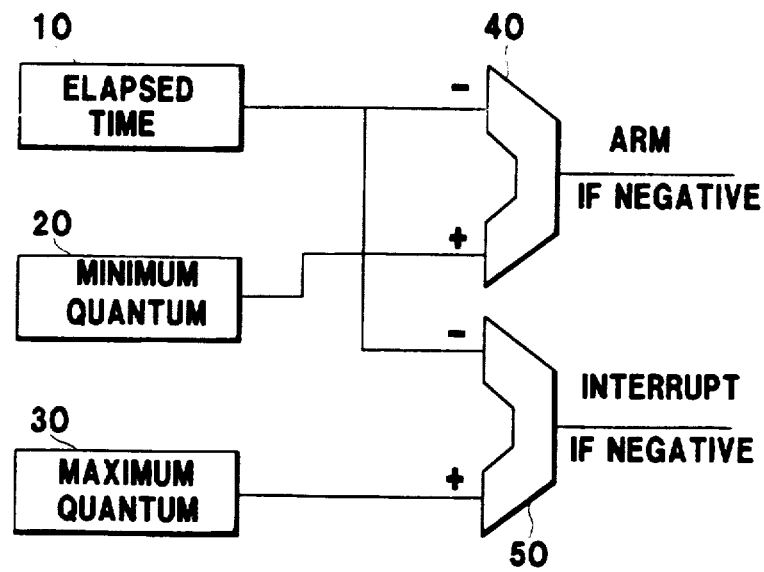
FIG. 1 is a block diagram illustrating the means for controlling a deferrable interrupt.

Definition of Terms and Environment of the Invention

A general purpose computer is said to run under the control of an executive control program, commonly called an operating system, which is a program which may be implemented in software, firmware, microcode or a combination of the three which controls the computer's hardware. The operating system responds to calls from the application program or task running on the computer to write data to a display screen, store and retrieve data to or from a disk storage and print out a report. The application program or task is said to run on the operating system. As used herein program or task are used interchangeably to mean an application program.

The subject invention is in the field of multi-programming systems of the type generally described in Section 3.6, "Multiprogramming Systems", at pages 81 to 88 of *Operating Systems*, by H. Lorin and M. M. Deitel, Addison-Wesley Publishing Co. (1981), and in Chapter 7, "Real Storage", at pages 155 to 174 of *An Introduction to Operating Systems*, by Harvey M. Deitel, Addison-Wesley Publishing Co. (1984). As used herein, the terms multi-programming and multi-tasking are used interchangeably.

In the preferred embodiment of the invention, it is assumed that the normal mode of operation of the multi-programmed or multi-tasking computer system operates under the control of an executive control program, or operating system, which maintains a list of executable tasks. The operating system selects a task for immediate execution from the list of available tasks, allocates a maximum execution time to the task selected, setting an interrupt to occur in the future at that time. This maximum time is called a quantum of time. The operating system then initiates execution of the task selected. The selected task executes for the quantum of time allocated to it, at which point the interrupt occurs and the task is suspended. The operating system then selects a different task from the list of executable tasks and repeats these steps.

In some cases, a currently running program or task is not able to complete its time quantum. This can occur for any of the following cases:

1. The program or task itself must wait for an external event to occur such as the completion of an input/output (I/O) operation. The task then must be suspended immediately and removed from the list of executable tasks. The operating system must initiate a different program or task at this point.

2. An external event such as the completion of an input/output (I/O) operation is recognized. The external event requires the operating system to initiate an input/output program and to alter the lists of tasks that are ready to execute and that are awaiting external events. The operating system can return to the task that was interrupted and let it complete its time quantum or select a new task.

3. If an external event is recognized, and an executing task is suspended temporarily, during the time of suspension its cumulative execution time does not increase.

DESCRIPTION OF THE INVENTION

The description of the foregoing environment is representative of the possible environments that support the invention, but the invention is not limited to this specific environment. The purpose of the invention is to defer the interrupt at the end of a time quantum to occur when the cost of a context swap is likely to be relatively low. The invention modifies the normal operation described above to become the following.

When the operating system allocates a time quantum to a selected task, it expresses the time quantum by two times, the earliest possible end of the time quantum and the latest possible end of the time quantum. An interrupt for end of quantum cannot occur before the earliest time and is guaranteed to occur at the latest time unless it is triggered by the executing program to occur before that point. The operating system initiates execution of the task selected, and the selected task executes for the minimum quantum of time allocated to it, at which point the end-of-quantum interrupt becomes armed. While the end-of-quantum interrupt is armed, the task continues execution. If the task executes an instruction that triggers the end-of-quantum interrupt, the interrupt is honored immediately. If no end-of-quantum interrupt is triggered before the task executes for the maximum alloted time, then the end-of-quantum interrupt is triggered. Regardless of how the end-of-quantum interrupt is triggered, the operating system treats the interrupt as a conventional end-of-interrupt quantum interrupt. If an external event triggers an interrupt while an executing task has an armed end-of-quantum interrupt, the task is treated as having reached its end of quantum, and the pending interrupt is removed.

Referring now to the drawings, and more particularly to FIG. 1, there is shown the mechanism for implementing the deferrable interrupt according to the invention. The mechanism comprises three registers and two adders. The registers are an elapsed-time register 10, a minimum-quantum register 20, and a maximum-quantum register 30. The first adder 40 forms the difference of the value of the minimum quantum and elapsed time. The sign of the result is negative if the elapsed time has exceeded the minimum quantum time. The negative sign causes the interrupt to be armed as described later. Similarly, the second adder 50 forms the difference in the value of the maximum quantum and the elapsed time. A negative sign on the result of this addition causes the interrupt to be posted as described later.

The difference between FIG. 1 and the prior art is that the conventional implementation of an interrupt based on elapsed time uses only the maximum-time register 30, the elapsed-time register 10 and the adder 50. The interrupt is posted by testing the sign of the result of the adder. The prior art does not contain the provision to arm an interrupt, and therefore the prior art does not teach the use of the minimum-time register 20 and the adder 40 shown in FIG. 1.

Figure 2:
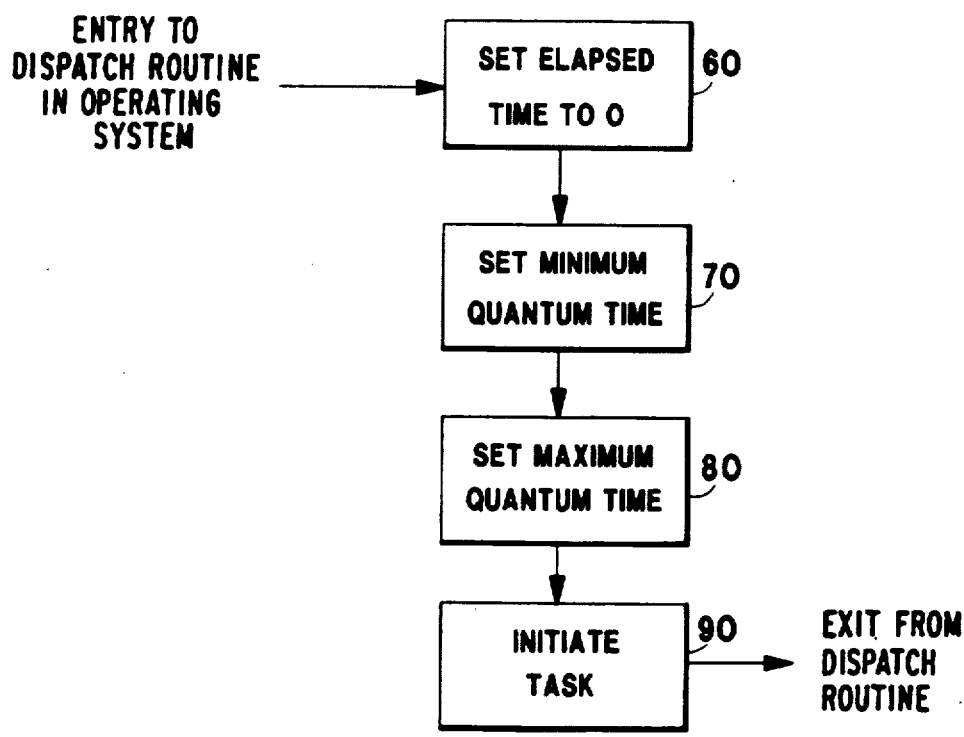
FIG. 2 is a block diagram illustrating the means for setting a deferrable interrupt.

FIG. 2 illustrates the steps taken by the operating system just prior to initiating the running of a task. The operating system initializes the elapsed time of the task to zero in function block 60, and initializes the minimum and maximum quantum times in function blocks 70 and 80 in FIG. 2. The final step in FIG. 2 is to initiate the task as indicated in 90. The order of the operations performed in function blocks 60, 70 and 80 is unimportant. The operating system may do other system dependent tasks interspersed with these tasks. The aspect of the figure that is not taught by the prior art is the setting of the minimum quantum time in block 70.

Figure 3:
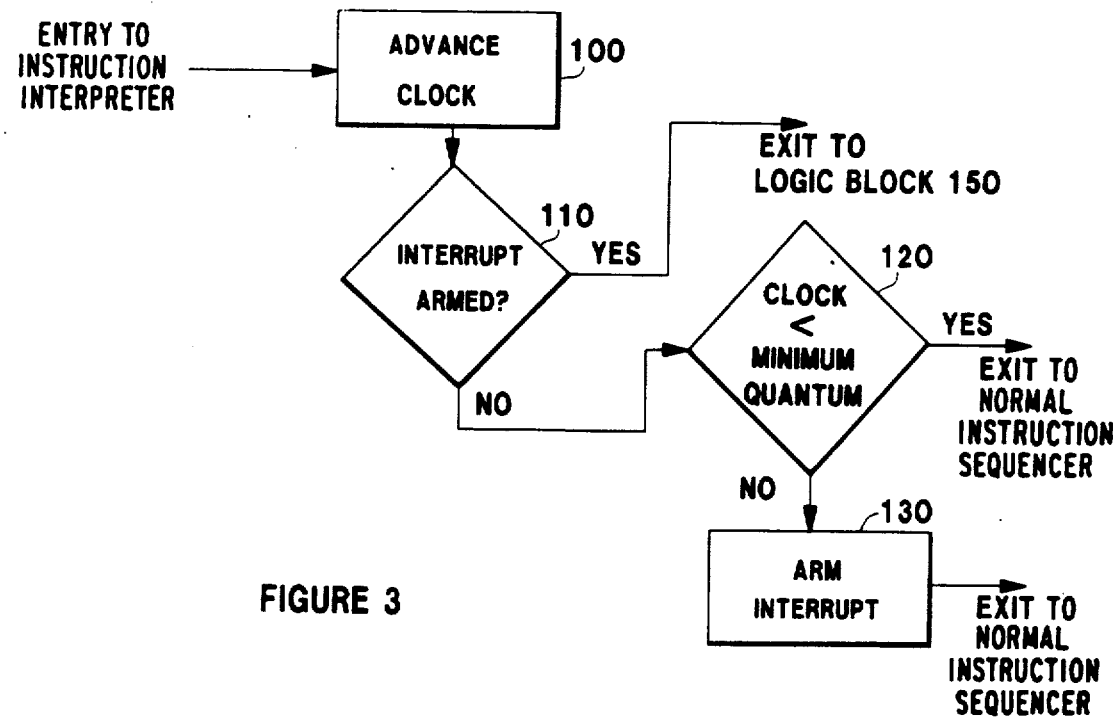
FIG. 3 is a flow chart showing the events that occur when the deferrable interrupt becomes armed.

FIG. 3 shows the logic required to arm the interrupt. The elapsed time for the running task is indicated by a clock, which is advanced as indicated in function block 100 in FIG. 3. The interval between executions of block 100 is system dependent, and it need not be done at the rate of the fastest clock in the system. Each time the clock advances, a test is made in decision block 110 to determine if the quantum-time interrupt is armed. If so, an exit is taken to decision block 150 in FIG. 4 where further tests are made as described below. If not, the current valve of the elapsed time is compared to the minimum quantum time in decision block 120. If the current value exceeds the minimum quantum time, the quantum-time interrupt becomes armed as shown in function block 130.

Figure 4:
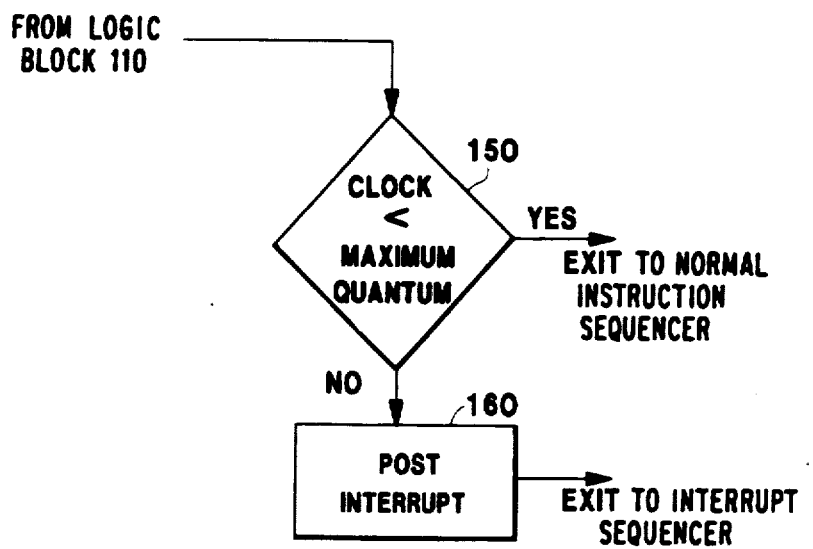
FIG. 4 is a flow chart showing the events that occur when a deferrable interrupt is posted due to the maximum quantum time being reached.

FIG. 4 shows how a quantum-time interrupt is posted. This figure reflects the prior art. In decision block 150, the current elapsed time is compared to the maximum quantum time. If the current value exceeds maximum quantum time, an interrupt is posted as shown in function block 160.

Figure 5:
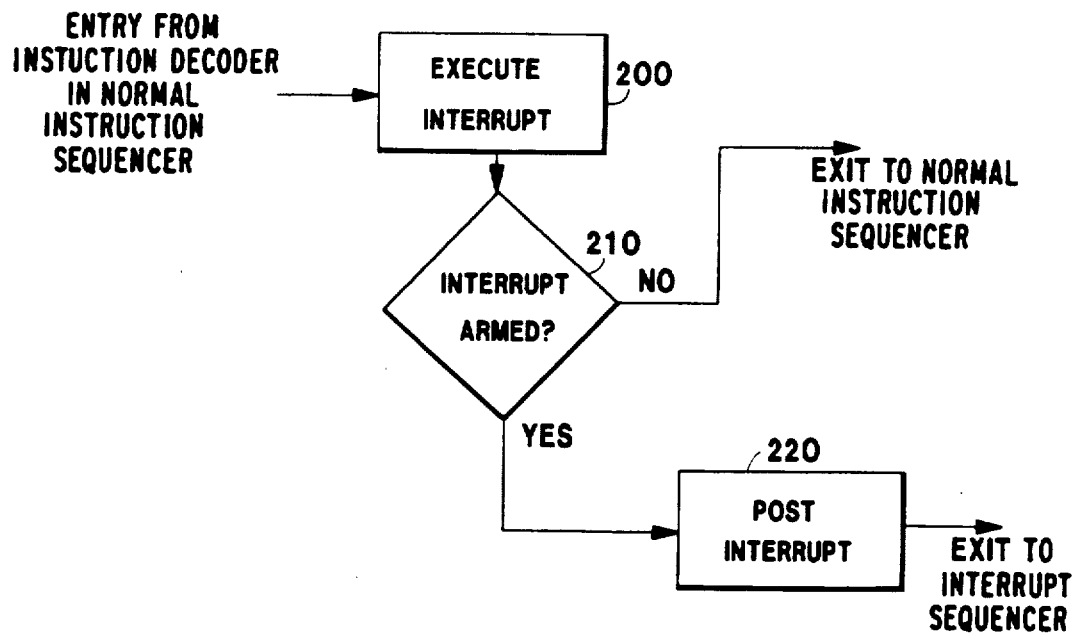
FIG. 5 is a flow chart showing how the program triggers an armed deferrable interrupt when it reaches a point where the interrupt should be recognized.

FIG. 5 illustrates how a program forces an armed interrupt to occur. The program executes a special instruction that is placed in a program where context swap overhead is locally smaller than the overhead incurred at other places. The execution of this instruction is shown in function block 200. The execution of the instruction causes a test of the state of the interrupt as shown in decision block 210. If the interrupt is armed, then it is posted in function block 220. The posting of the interrupt signifies the end of the quantum. The operating system will react to the interrupt by suspending the task using techniques available in the prior art in response to the end of the time quantum. If the interrupt is unarmed, then the special instruction has no effect on program execution other than to utilize the time required to fetch and interpret the interrupt instruction.

Figure 6:
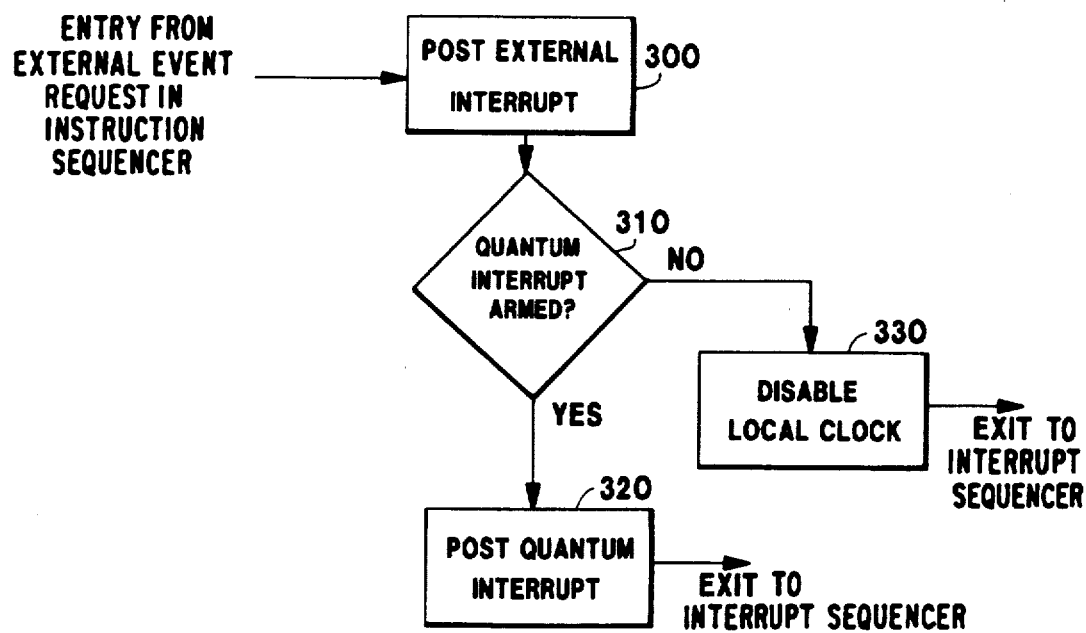
FIG. 6 is a flow chart showing the action that is taken to disable a deferrable interrupt if a task is interrupted before its deferrable interrupt is armed.

FIG. 6 illustrates how an external event can trigger an end-of-quantum interrupt. Function block 300 shows an interrupt being posted by an external event. When this occurs, the quantum-time interrupt is checked in decision block 310. If it is armed, then in function block 320, it is posted as an interrupt as well, thus causing at least two interrupts to be actively pending. If it is not armed, then, in function block 330, the advance of the register devoted to recording the elapsed time for the running task is disabled. At this point, the operating system will suspend the running task and schedule a task associated with the external event.

The important new idea of FIG. 6 that is not taught by the prior art is that an external event is an opportune time to force a context swap that otherwise may not be taken until later. Because the original task will be suspended briefly to permit a second task to run, the second task will load itself into cache memory and thereby remove part of the state associated with the first task. This will produce a local reduction in the size of the state associated with the first task. At the completion of running the second task, the operating system would normally return to the first task because its time quantum has not run out. However, if the quantum interrupt is armed, then an interrupt can be taken at any point where the size of the state to be swapped is relatively small. This occurs at the end of processing the interrupting task. By posting the quantum-time interrupt as indicated in function block 320 of FIG. 6, the operating system will not return to the original task after processing the interrupting task, thereby causing the context swap to occur at a locally good point in time.

Thus, an armed quantum-time interrupt can be posted by either the execution of an instruction or by the posting of an external-event interrupt. In general, an armed interrupt should be posted under any condition that is recognized to produce a locally small context. The conditions under which this is the case depend on the characteristics of the computer system.

Broadly described, the invention consists of (1) an interrupt for context swapping that tends to occur when program footprints are small and (2) a means for triggering the interrupt at the point that a footprint decreases in size. Context-swap interrupts are triggered on the following events:
1. Exit from a basic block;
2. Closing a file (when buffer storage is returned); and
3. Other similar detectable events when storage is returned for use for other purposes.

These events can be signaled by a special interrupt instruction placed in the code by the compiler. The action of the special instruction is to cause an interrupt if the context-swap interrupt has been armed, and to have no effect otherwise. A simple and expedient way of generating the interrupts is to force the interrupts to occur when subroutine returns and interrupt returns are executed. In each case, a program or process is being exited, and its state is unlikely to be needed in the near future. A more effective method is to use algorithmic analysis to determine when a subroutine exit occurs that has the characteristic that the subroutine is a large straight-line code or has one or more nesting levels of loops, and the total number of data and instruction cells likely to be touched by the subroutine is on the order of the cache size. When this characteristic is detected, the subroutine will tend to occupy a large fraction of cache and that fraction will not be needed by subsequent code.

If a context-swap interrupt occurs before execution of a subroutine is ended, the subroutine will have to be reloaded in cache before the exit occurs. If the context-swap interrupt waits for the exit of the subroutine, the cache-reload transient is avoided. By identifying a subroutine with the property above, a compiler can insert a context-swap interrupt trigger just before the exit of each such routine. This invention offers performance improvements whichever means is used for triggering interrupts. The performance improvement tends to be greater if the interrupts can be associated with the greatest reductions in footprint sizes.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for reducing cache-reload transient in a context swap in a multi-programmed computer system, said method comprising computer operating system performed steps of:

maintaining a list of tasks to be performed and calling a task from the list of tasks;

setting an elapsed time for said task to zero;

setting minimum and maximum quantum times for said task, said minimum and maximum quantum times being different;

initiating said task advancing said elapsed time for said task while said task is running;

comparing said elapsed time with said minimum quantum time;

if said elapsed time exceeds said minimum quantum time, arming an interrupt;

checking to determine if an interrupt is armed;

if an interrupt is armed, comparing elapsed time with said maximum quantum time; and if said elapsed time exceeds said maximum time, posting said armed interrupt for execution when a predetermined programmed instruction is executed.

2. A method for reducing cache-reload transient in a context swap in a multi-programmed computer system, said method comprising computer operating system performed steps of:

maintaining a list of tasks to be performed and calling a task from the list of tasks;

setting an elapsed time for said task to zero;

setting minimum and maximum quantum times for said task, said minimum and maximum quantum times being different;

initiating said task;

advancing said elapsed time for said task while said task is running;

comparing said elapsed time with said minimum quantum time;

if said elapsed time exceeds said minimum quantum time, arming an interrupt;

checking to determine if an interrupt is armed;

if an interrupt is armed, comparing elapsed time with said maximum quantum time; and if said elapsed time exceeds said maximum time, posting said armed interrupt for execution when cache storage is returned for other purposes, such as by the initiation of interrupt routines when the processor is preempted to respond to external interrupts.

3. An apparatus for reducing cache-reload transient in a context swap in a multi-programmed computer system comprising:

means for maintaining a list of tasks to be performed and calling a task from the list of tasks;

elapsed time register means for storing a value corresponding to a time of running the task on said multi-programmed computer system;

minimum quantum time register means for storing a value corresponding to a minimum quantum time assigned to said task;

maximum quantum time register means for storing a value corresponding to a maximum quantum assigned to said task said minimum and maximum quantum times being different;

comparison logic means connected to said elapsed time register means and said minimum and maximum quantum time register means for comparing elapsed time to minimum quantum time and elapsed time to maximum quantum time, said comparison logic means comprising first adder means for computing a different between a value in said elapsed time register means and a value in said minimum quantum register means, and second adder means for computing a difference between a value in said elapsed time register means and a value in said maximum quantum register means;

means for arming an interrupt in response to a negative output of said first adder means; and means for checking to determining if an interrupt is armed and, if so, posting said armed interrupt for execution when a predetermined programmed instruction is executed in response to a negative output of said second adder means.

4. An apparatus for reducing cache-reload transient in a context swap in a multi-programmed computer system comprising:

means for maintaining a list of tasks to be performed and calling a task from the list of tasks;

elapsed time register means for storing a value corresponding to a time of running the task on said multi-programmed computer system;

minimum quantum time register means for storing a value corresponding to a minimum quantum time assigned to said task;

maximum quantum time register means for storing a value corresponding to a maximum quantum assigned to said task said minimum and maximum quantum times being different;

comparison logic means connected to said elapsed time register means and said minimum and maximum quantum time register means for comparing elapsed time to minimum quantum time and elapsed time to maximum quantum time, said comparison logic means comprising first adder means for computing a different between a value in said elapsed time register means and a value in said minimum quantum register means, and second adder means for computing a difference between a value in said elapsed time register means and a value in said maximum quantum register means;

means for arming an interrupt in response to a negative output of said first adder means; and means for checking to determine if an interrupt is armed and, if so, posting said armed interrupt for execution when cache storage is returned for other purposes, such as by the initiation of interrupt routines when the processor is preempted to respond to external interrupts, in response to a negative output of said second adder means.

* * * * *